US008250384B2

(12) United States Patent
Borghetti et al.

(10) Patent No.: US 8,250,384 B2
(45) Date of Patent: Aug. 21, 2012

(54) OPTIMIZER MECHANISM TO INCREASE BATTERY LENGTH FOR MOBILE DEVICES

(75) Inventors: Stefano Borghetti, Viterbo (IT);
Gianluca Della Corte, Naples (IT);
Leonida Gianfagna, Rome (IT);
Antonio Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/348,462

(22) Filed: Jan. 5, 2009

(65) Prior Publication Data
US 2010/0174928 A1   Jul. 8, 2010

(51) Int. Cl.
*G06F 1/00* (2006.01)
*G06F 1/26* (2006.01)
*G06F 1/32* (2006.01)

(52) U.S. Cl. .................. 713/300; 713/320; 713/340

(58) Field of Classification Search .................. 713/300, 713/320, 340
See application file for complete search history.

(56) References Cited

U.S. PATENT DOCUMENTS

| | | | |
|---|---|---|---|
| 5,964,879 A * | 10/1999 | Dunstan et al. ............... | 713/340 |
| 6,151,568 A | 11/2000 | Allen et al. | |
| 6,907,010 B2 | 6/2005 | Zhang | |
| 7,036,034 B2 | 4/2006 | Kobayashi et al. | |
| 7,197,652 B2 | 3/2007 | Keller, Jr. et al. | |
| 7,730,331 B2 | 6/2010 | Yoon et al. | |
| 7,849,344 B2 | 12/2010 | Karstens | |
| 7,894,421 B2 | 2/2011 | Kwan | |
| 2002/0144167 A1* | 10/2002 | Kobayashi et al. ........... | 713/340 |
| 2003/0112796 A1 | 6/2003 | Kwan | |
| 2003/0149904 A1 | 8/2003 | Kim | |
| 2004/0203402 A1 | 10/2004 | Zhang | |
| 2005/0144167 A1 | 6/2005 | Yamamoto | |
| 2006/0242441 A1 | 10/2006 | Yoon et al. | |
| 2007/0094519 A1* | 4/2007 | Yamamoto .................... | 713/300 |
| 2008/0082851 A1* | 4/2008 | Zettler .......................... | 713/340 |
| 2009/0006878 A1 | 1/2009 | Borghetti et al. | |

(Continued)

FOREIGN PATENT DOCUMENTS
JP 2009075934 A * 4/2009
(Continued)

OTHER PUBLICATIONS
U.S. Appl. No. 12/147,803, filed Jun. 28, 2008, Borghetti, et al.
(Continued)

*Primary Examiner* — Mark Connolly
(74) *Attorney, Agent, or Firm* — Stephen J. Walder, Jr.; John D. Flynn

(57) ABSTRACT

An optimizer mechanism to increase battery length for mobile devices is provided. An operational state of a data processing system, e.g., a mobile device, is adjusted so as to achieve a target time period of operation when the data processing system is using a depleting power supply. A predicted power consumption of individual processes executing on the data processing system is determined and a remaining amount of power that the depleting power supply can provide is also determined. A subset of processes whose execution can be suspended is determined so that the data processing system can operate for the target period of time based on the predicted power consumption of the individual processes and the amount of power that the depleting power supply can provide. The identified subset of processes are placed in a suspended execution state.

20 Claims, 3 Drawing Sheets

U.S. PATENT DOCUMENTS

| | | | |
|---|---|---|---|
| 2009/0007108 A1 | 1/2009 | Hanebutte | |
| 2009/0007128 A1 | 1/2009 | Borghetti et al. | |
| 2009/0024863 A1* | 1/2009 | Karstens | 713/340 |
| 2009/0094473 A1* | 4/2009 | Mizutani | 713/340 |
| 2009/0195602 A1 | 8/2009 | Kazumichi | |
| 2010/0048139 A1 | 2/2010 | Seo et al. | |
| 2010/0174928 A1 | 7/2010 | Borghetti et al. | |

FOREIGN PATENT DOCUMENTS

WO    WO 2007/0130184      11/2007

OTHER PUBLICATIONS

Hsu, Chung-Hsing et al., "Effective Dynamic Voltage Scaling through Accurate Performance Modeling", DOE LDRD Program through Los Alamos National Laboratory contract W-7405-ENG-36, technical report LA-UR-03-7582, pp. 1-10.

USPTO U.S. Appl. No. 12/147,803, 1 page.

Response to Office Action filed with the USPTO on Oct. 20, 2011 for U.S. Appl. No. 12/147,803, 18 pages.

USPTO U.S. Appl. No. 12/147,855, 2 pages.

Final Office Action mailed Nov. 29, 2011 for U.S. Appl. No. 12/147,855; 26 pages.

Notice of Allowance mailed Dec. 1, 2011 for U.S. Appl. No. 12/147,803; 23 pages.

"Dynamic Power Management", SourceForge.net, accessed Sep. 30, 2011, http://dynamicpower.sourceforge.net/, pp. 1-2.

"IBM Tivoli Intelligent Orchestrator", Product Overview, accessed Nov. 9, 2011, http://web.archive.org/web/20070310215605/http://www-306.ibm.com/software/tivoli/products/intell-orch/, 4 pages.

Chang, Fay et al., "Energy-driven Statistical Profiling: Detecting Software Hotpsots", In Workshop on Power-Aware Computer Systems, 2000, pp. 1-11.

Contreras, Gilberto et al., "Power Prediction for Intel XScale Processors Using Performance Monitoring Unit Events", Proceedings of the 2005 International Symposium on Low Power Electronics and Design, Aug. 2005, pp. 221-226.

Ethier, Sheridan, "ZNX Technical Articles, Implementing Power Management on the Biscayne SH7760 Reference Platform Using the QNX Neutrino RTOS", QNX Software Systems, accessed Sep. 30, 2011, http://www.qnx.com/developers/articles/article_296_2.html, pp. 1-5.

Jayaseelan, Ramkumar et al., "Estimating the Worst-Case Energy Consumption of Embedded Software", Proceedings of the 12th IEEE Real-Time and Embedded Technology and Applications Symposium, Apr. 2006, pp. 81-90.

Li, Tao et al., "Run-time Modeling and Estimation of Operating System Power Consumption", ACM Sigmetrics Performance Evaluation Review, vol. 31, Iss. 1, Jun. 2003, 12 pages.

Simunic, Tajana, "Chapter 1: Dynamic Management of Power Consumption", Robert Graybill and Tami Melhen, editors, Power Aware Computing, Kluwer Academic Publishers, Ch. 1, 2002, pp. 1-24.

\* cited by examiner

OPTIMIZER MECHANISM TO INCREASE BATTERY LENGTH FOR MOBILE DEVICES

BACKGROUND

The present application relates generally to an improved data processing apparatus and method and more specifically to an optimizer mechanism to increase battery length for mobile devices.

Reducing energy consumption in data processing system operations is becoming an increasingly important requirement. Energy saving is a very important issue due to environmental impact and to increasing costs. Furthermore, risks and costs related to energy supply interruption (blackout) caused by high consumption and excessive requests by the users must be taken into account.

One area in which energy consumption is of great importance is with regard to battery power of portable devices, such as mobile telephones, laptop computers, and the like. Often it occurs that a user may be operating their portable device, e.g., a laptop, and may need to perform certain operations but may not have the reserve battery power to complete these operations. For example, a user may need to use the laptop computer to present a plurality of slides as part of a presentation to other persons yet may not have sufficient battery power to operate the laptop computer for the entire time of the presentation. While the laptop computer may be plugged into a wall socket in order to have a constant supply of electrical power, there are often times where such a source of electrical power is not available. Thus, the user, not having enough battery power to run the laptop computer for the entire time to complete the presentation, and not having access to a wall socket or other constant source of electrical power, will not be able to complete the presentation or other operations for which the portable device, e.g., laptop computer, is required.

In a data processing system it is known to monitor the consumption of individual hardware devices and to apply some correction actions in order to optimize the total power consumption of the data processing system. For example, U.S. Pat. No. 7,197,652 discloses a mechanism for energy management in a multithread data processing system. The method provides per-device usage evaluators within performance monitor units which monitor the use of connected hardware devices. However power consumption may also depend on the way the hardware devices are used. For example, power consumption may depend on the software applications being run on the system and on the software and hardware resources used by the applications.

SUMMARY

In one illustrative embodiment, a method, in a data processing system, is provided for adjusting an operational state of the data processing system so as to achieve a target time period of operation when the data processing system is using a depleting power supply. The method comprises determining a predicted power consumption of individual processes executing on the data processing system and determining a remaining amount of power that the depleting power supply can provide. The method further comprises identifying a subset of processes whose execution can be suspended so that the data processing system can operate for the target period of time based on the predicted power consumption of the individual processes and the amount of power that the depleting power supply can provide. Moreover, the method comprises placing the identified subset of processes in a suspended execution state.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
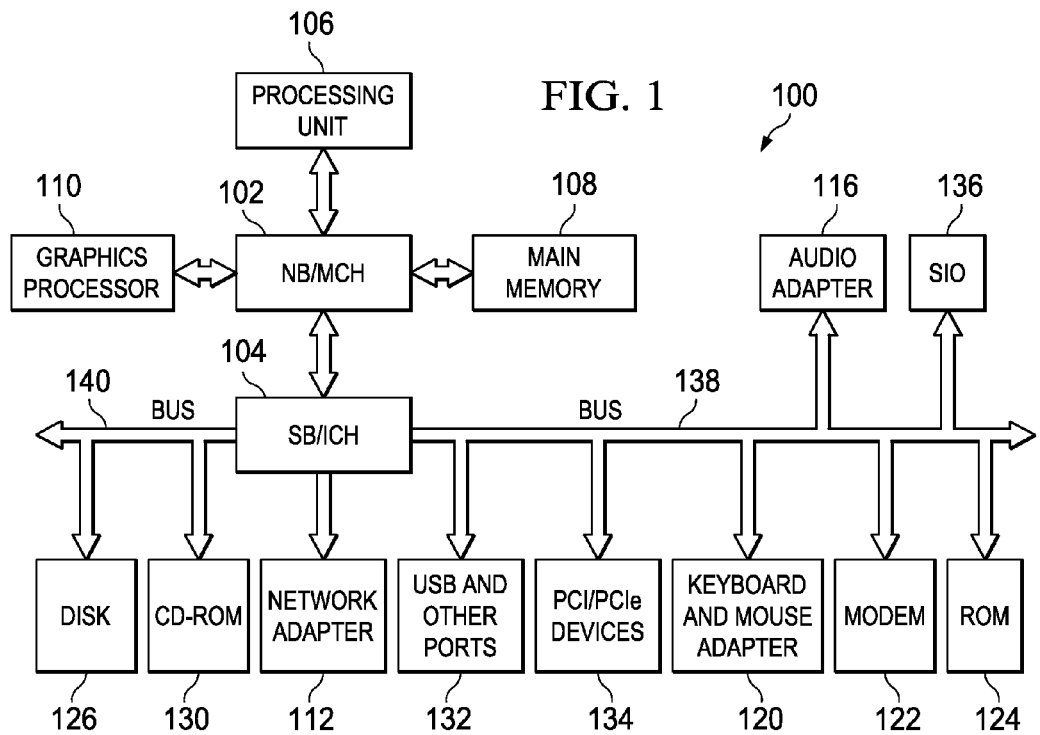
FIG. 1 is an example block diagram of a data processing system in which the mechanisms of the illustrative embodiments may be implemented.

The illustrative embodiments provide a mechanism for optimizing the processes executing on a data processing system so as to increase battery length for the data processing system. In particular, with the mechanisms of the illustrative embodiments, a user inputs information indicating a target time period for which operation of the data processing system is desired based on the battery power. In addition, the user may specify one or more processes, applications, or the like, that the user wishes to utilize during the specified target time period. The optimizer mechanism of the illustrative embodiments determines a priority of the processes executing on the data processing system based on the identified one or more processes that the user requires, process dependencies, operating system requirements, and the like. Based on the priorities assigned to the various processes, the optimizer mechanism creates an initial process list.

The optimizer mechanism uses a predictive power consumption module to calculate the trend of the process consumption and an estimate for the battery duration. From the calculated trend and estimated battery duration, a running process list (RPL) and a frozen process list (FPL) are generated. The RPL contains the identifiers of the processes that will be executed during the target time period and the FPL includes the identifiers of the processes that will be put into a frozen status in order to meet the user's target requirements for the battery length. In addition, the optimizer mechanism may determine an optimum processor clock frequency to achieve the user's target requirements for the battery length, i.e. the target time period.

In one illustrative embodiment, the manner by which the FPL and RPL are populated is to assign all processes to the FPL, with the exception of the required processes identified by the user, and then move processes to the RPL in priority order until the user's target requirements for the battery length cannot be met as determined by the predictive power consumption module. In another illustrative embodiment, processes may start in the RPL and be moved to the FPL until the predictive power consumption module determines that the user's target requirements for the battery length are met.

The optimizer mechanism continues to monitor the system to determine if the system is or is not going to meet the user's requirements for battery power. If the target time period, or user's requirement for battery power, will be met under the current allocation of processes to the RPL and FPL at the time the optimizer mechanism is monitoring the state of the system, then no adjustments need to be made. However, if the target time period, or user's requirements for battery power, will not be met, then adjustments to the RPL and FPL are made in a dynamic manner to adjust the operation of the system such that the user's requirements for battery power are more likely to be met. Such monitoring and adjustments can be done on a continuous or periodic manner while the data processing system is operating on battery power. If at any time the user's requirements for battery power cannot be met under any circumstances, a message may be output to the user indicating the inability to meet the user's requirements.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

In accordance with one illustrative embodiment, the data processing system 100 is a data processing system which, in one mode of operation, operates off of a depleting source of power, such as battery power, rather than a constant source of power from a wall socket or other source of electrical power. For purposes of the illustrative embodiments, it will be assumed that the data processing system 100 is a portable computing device, such as a laptop computer, that operates off of a battery power supply that is chargeable by an electrical connection to a wall socket or other source of constant electrical supply. The illustrative embodiments operate to optimize the operation of the data processing system 100 in the event that the data processing system 100 is not connected to the constant electrical supply and must operate only on the stored up battery power supply.

When a user needs to operate the data processing system 100 only on a depleting power supply, such as a battery power supply, and requires a predetermined period of time of operation of the data processing system 100, the mechanisms of the illustrative embodiments may be used to dynamically modify the operation of the data processing system 100 so as to provide the desired operation for the entire period of time of operation required by the user, if possible. The mechanisms of the illustrative embodiments prioritize the processes executing on the data processing system 100 and, based on these priorities, either permits a process to execute or places the process in a frozen state. The determination of how many of the processes to put in a frozen state may be made based on a predictive power consumption determination for the time period of required operation specified by the user. The operation of the data processing system 100 may be continuously or periodically monitored during the time period of required operation, hereafter referred to as the target time period, so as to dynamically adjust which processes are permitted to execute and which processes are frozen to ensure that the data processing system 100 operates for the target time period.

Figure 2:
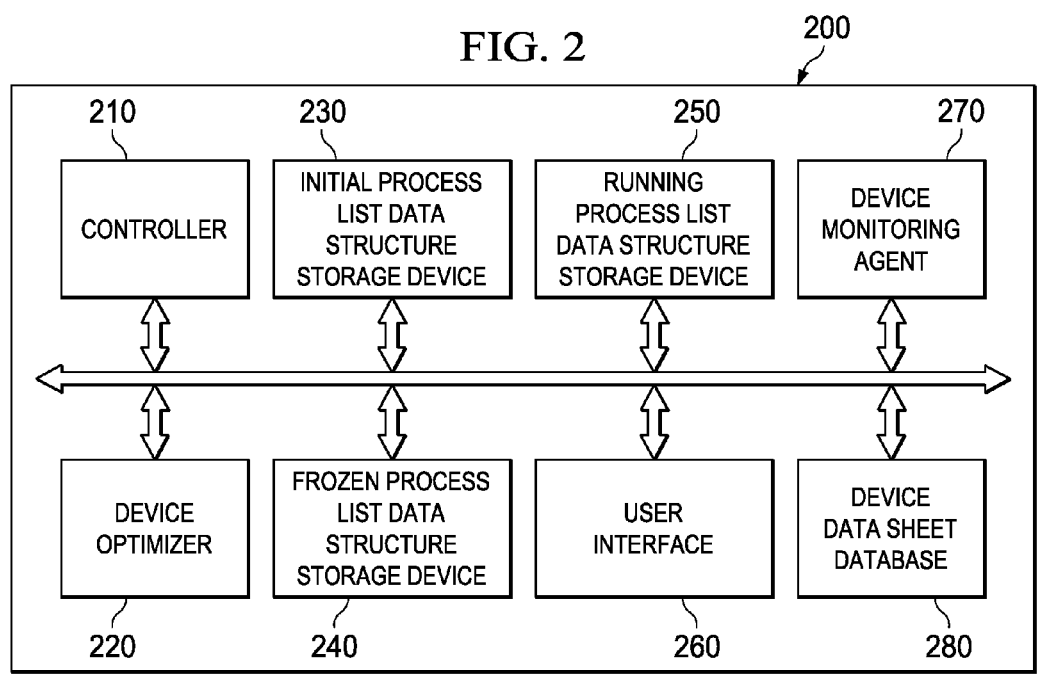
FIG. 2 is an example block diagram of the primary operational elements of an optimizer mechanism in accordance with one illustrative embodiment.

FIG. 2 is an example block diagram of the primary operational elements of an optimizer mechanism in accordance with one illustrative embodiment. As shown in FIG. 2, the optimizer 200 includes a controller 210, a device optimizer 220, an initial process list data structure storage 230, a frozen process list data structure storage 240, a running process list data structure storage 250, a user interface 260, a device monitoring agent 270, and a device data sheet database 280. The elements 210-280 of FIG. 2 may be implemented in hardware, software, or any combination of hardware and software. For purposes of the illustrative embodiments, the elements 210-280 are considered to be software instructions executed on one or more processors of a data processing system, such as processing unit 106 in data processing system 100, for example.

The controller 210 controls the overall operation of the optimizer 200 and orchestrates the operation of the other elements 220-280. The device optimizer 220 communicates and controls various devices of the data processing system to modify their operation in accordance with instructions received from the controller 210. For example, the device optimizer 220, in response to receiving instructions from the controller 210, may send control signals to one or more of these devices to modify the device operations, e.g., change the clocking frequency of the devices, turn off the devices, change a mode of operation of the devices, or the like. The devices that may be controlled in this manner may be any hardware device of the data processing system including the processor(s), memories, hard drives, network adapters, output adapters (graphics cards, audio cards, and the like), etc.

The initial process list data structure 230 stores a list of processes executing on the data processing system when the optimizer 200 is first invoked. The processes in the initial process list data structure 230 are used by the optimizer 200 as a basis for prioritizing these processes with subsequent assignment of the processes to either a frozen list or a running list according to the optimum operation of the data processing system to achieve a desired operational target time.

The frozen list data structure 240 stores a list of processes that the optimizer 200 has determined should be placed in a frozen state, i.e. a state in which the process is not actively executing but whose state is maintained in memory for subsequent restart of the process, so as to achieve a desired time of operation of the data processing system, i.e. the target time period. The running process list data structure 250 stores a list of processes that the optimizer 200 has determined should be allowed to execute during the target time period. Processes may be moved between the frozen list data structure 240 and the running process list data structure 250 as necessary to achieve the target time period, or when it is determined that excess battery power is available, in a dynamic manner according to the determinations made by the optimizer 200.

The user interface 260 provides a communication interface through which the optimizer 200 receives input from a user specifying the target time period. Moreover, through the user interface 260, a user may further specify one or more processes, applications, or the like, that the user needs to have operational during the target time period. Moreover, the user interface 260 may be used by the controller 210 of the optimizer 200 to output messages to the user indicating whether or not the target time period, or remainder of the target time period, is achievable under current circumstances taking into account the processes, applications, etc. that the user has specified must be allowed to execute during the target time period.

The device monitoring agent 270 monitors power consumption of the various devices, e.g., processor(s), hard drive(s), network adapter(s), etc., of the data processing system and perform a predictive power consumption operation to predict the amount of power that will be consumed by these devices over the target time period. The device data sheet database 280 provides information about each of the devices monitored by the device monitoring agent 270 to aid in the predictive power consumption operation. The operation and interaction of these elements 210-280 will now be described in greater detail with reference to one example implementation.

The operation of the optimizer 200 may be initiated either manually by a user initiating the operation of the optimizer, or automatically in response to an event, e.g., disconnect of the data processing system from a constant source of power such that the data processing system operates based on a depleting power supply (battery power supply, for example). The controller 210 may prompt a user for input by requesting that the user specify a target time period for which the user requires operation of the data processing system using the depleting power supply. Moreover, the controller 210 may prompt the user to specify one or more processes, applications, or the like, that the user requires to be allowed to execute during the target time period. This input may be stored by the controller 210 in an associated memory for use by the controller 210 in determining how to assign processes to the frozen and running list data structures.

The controller 210 compiles a currently running process list in the initial process list data structure storage 230. This initial process list, along with the user specified required processes, is used by the controller 210 to determine a prioritized listing of processes. The controller 210 assigns priorities to each of the processes according to a predetermined set of rules and logic executed by the controller 210. These rules and logic specify a prioritization order for processes based on characteristics of the processes, their dependencies, and interactions. For example, the processes specified by the user that need to execute during the target time period are given a highest priority. Processes upon which the required processes depend are given a next greatest priority. Processes required by the operating system are also given a relatively high priority. Processes, e.g., device drivers or the like, required by devices utilized by the user specified required processes, may be given a next highest priority, and so forth. Processes not required by any of the user specified processes, processes upon which the user specified processes are dependent, or processes that are not required by devices utilized by the user specified required processes, for example, may be given a lowest priority. Any prioritization scheme, as will become apparent to those of ordinary skill in the art in view of the present description, may be used without departing from the spirit and scope of the illustrative embodiments.

In addition to the prioritized list, the controller 210 utilizes the predictive power consumption determinations of the device monitoring agent 270 to determine that amount of power that is predicted to be consumed by each of the processes on the devices of the data processing system. One example of the manner by which the device monitoring agent 270 may perform such a predictive power consumption is described in commonly assigned and co-pending U.S. patent application Ser. No. 12/147,803 filed Jun. 28, 2008. A description of this example mechanism will now be provided. However, it should be appreciated that many modifications to this example mechanism may be utilized with the mechanisms of the illustrative embodiments. Moreover, other mechanisms for performing a predictive power consumption determination for processes executing on one or more devices of a data processing system may be used without departing from the spirit and scope of the illustrative embodiments.

Figure 3:
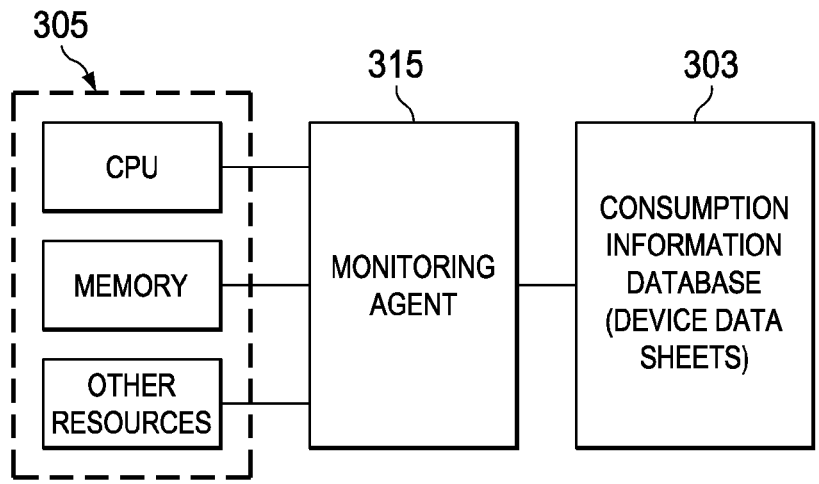
FIG. 3 is an example block diagram of the primary operational elements of a predictive power consumption engine in accordance with one illustrative embodiment.

FIG. 3 is an example block diagram of the primary operational elements of a predictive power consumption engine in accordance with one illustrative embodiment. As shown in FIG. 3, a monitoring agent 315, which may be the same as the device monitoring agent 270 of FIG. 2, controls and executes monitoring operations on several resources 305, connected by a communication network. The set of resources 305 includes resources, e.g., hard disks, CPUs, memories, network cards, printers, backup devices, etc., whose consumption information is stored in the data sheet repository or database 303 which contains all information available on each monitored resource. This information is normally available through device datasheets provided by device manufacturers.

The monitoring agent 315 controls a potentially large set of resources 305 which can even be distributed over a plurality of interconnected systems. In FIG. 3, as an example, only two resources are shown for simplicity: a CPU and a Memory. The monitoring agent 315 monitors the usage of resources per process. The monitoring agent 315 further retrieves information from the device datasheet repository or database 303 where an estimate of the consumption for each activity is stored. Putting together the two measures, an expected consumption of the resource is estimated. According to one illustrative embodiment, the device datasheet repository 303 contains values which are obtained from manufacturers' energy consumption datasheets which are to be combined with the usage metrics collected by the monitoring agent 315 in order to obtain the final energy consumption estimate. However, other possible solutions are available, e.g., the values stored could be the results of historical measurement which have been stored for future reuse.

In one illustrative embodiment, a new feature is inserted in a system availability monitoring product which estimates the power consumption of the system starting from the measurement of some parameters collected by the International Business Machines (IBM) Tivoli Monitoring tools available from IBM Corporation of Armonk, N.Y. The usage of each resource can be calculated through such a modified monitoring tool according to some specific parameters. In one illustrative embodiment, the calculated metrics of the usage are based on the measurement of the time during which a resource is in a predetermined status. Each resource has an associated table which determines the expected power consumption of the resource according to the status. According to one illustrative embodiment, a possible table describing a resource (in this example, a hard disk) has the following information:

| STATUS | EXPECTED POWER (W) |
|---|---|
| 1 Sleep | 0.15 |
| 2 Idle | 1.6 |
| 3 Standby | 0.35 |
| 4 Active | 3.2 |
| 5 Seeking | 4.1 |
| 6 Spin up | 4.2 |

Suppose that during the execution of a software application A, hard disk HD1 has been detected by the modified monitoring tools to be X seconds in status 2 above, Y seconds in status 4 above, and Z seconds in status 5 above. The monitoring agent 315 of the illustrative embodiments puts together all this information to estimate a total power consumption of hard disk HD 1 when used by software application A, e.g., Power=1.6X+3.2Y+4.1Z. Similar calculations are done for each resource used by the software application A and a total power consumption for software application A is estimated by the monitoring agent 315. Each component has an associated table with the description of power consumption related to the component status that can be checked during power measurements.

Figure 4:
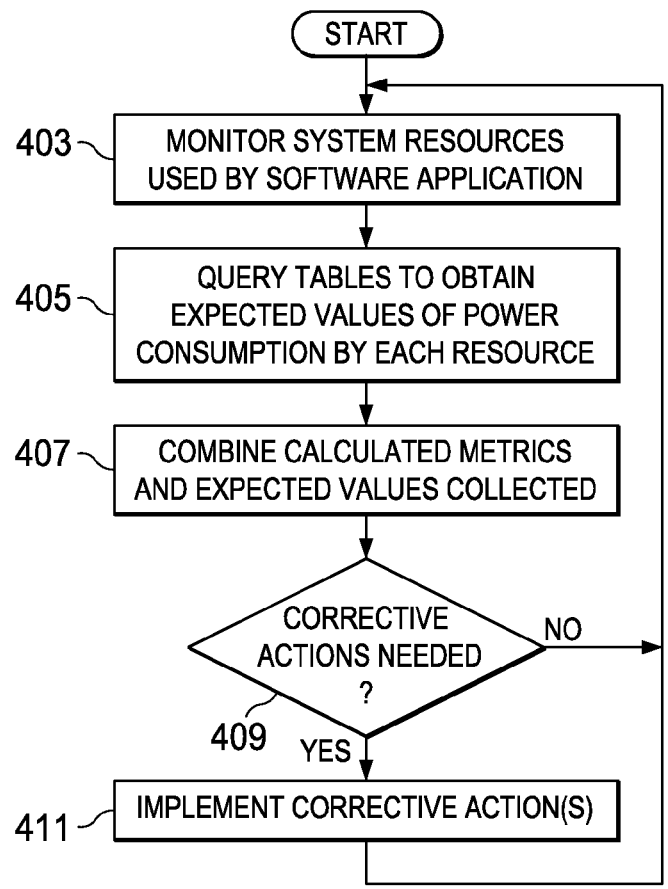
FIG. 4 is an example flowchart outlining an operation of a predictive power consumption engine in accordance with one illustrative embodiment.

FIG. 4 is an example flowchart outlining an operation of a predictive power consumption engine, such as may be provided by the monitoring agent 315 or device monitoring agent 270, in accordance with one illustrative embodiment. The operation outlined in FIG. 4 shows the logic flow for generating an estimate of the total power consumption of a software application. The operation starts with the system resources used by the software application being monitored (step 403). The list of possible monitored resources includes storage devices, CPUs, graphic cards, hard disks and more generally any kind of system resource which cause a power usage during execution of a software application. As explained above the system calculates metrics of the usage which are based on the measurement of the time during which a resource is in a predetermined status. Each resource has an associated table, determining the expected power consumption according to the status.

These tables are queried to obtain the expected values of the power consumption by each resource according to the detected status (step 405). The total consumption of the software application is estimated by putting together, e.g., summing, the calculated metrics and the expected values collected in the previous steps (step 407). A determination is made as to whether any corrective actions are needed, due to an excessive power consumption (step 409). If corrective action is necessary, then the corrective actions are implemented (step 411). Thereafter, or if corrective action is not necessary, the operation returns to step 403. Those skilled in the art will easily appreciate that other actions could be implemented instead, e.g. more dramatic corrective measures could be put in place when a predetermined danger threshold is reached: for example the access to a resource could be suspended if the overall functioning of the data processing system is in danger.

Similar considerations apply if programs and data are structured in a different manner, if other modules or functions are provided, or if the information is stored in equivalent memory structures. Similar considerations apply if the method includes equivalent or additional steps. Alternatively, for example different methods of obtaining the information on the monitored resources can be used, depending also on the operating system on which the system is installed. It would be possible for example that a License Management tool is adapted for collecting such information.

It should be appreciated that the "corrective actions" referred to in steps 409 and 411 may in fact be the placement of processes or applications into a frozen state in accordance with the illustrative embodiments. This operation may be performed with regard to each process, application, or the like so as to obtain a measure of the predicted power consumption of the process, application, or the like. This predicted power consumption may be extrapolated over the target time period to determine the amount of power that the particular process, application, or the like is expected to consume during the target time period. This amount of power may be combined with similar calculations of other amounts of power for other applications, processes, etc. to determine a combination of applications, processes, and the like that may achieve the target time period.

It should be noted that, in addition to determining the power consumption of processes, applications, etc. on the various resources, the affects of changing the operating, or clocking, frequency of the processors or resources may also be investigated in a similar manner. One way in which the clocking frequency or operational frequency of such processors or resources may be modified is described in Hsu et al., "Effective Dynamic Voltage Scaling through Accurate Performance Modeling," Advanced Computing Laboratory, Los Alamos National Laboratory, available as technical report LA-UR-03-7582, which is hereby incorporated by reference. Thus, a combination of processes, applications, and the like, with different clocking frequencies may be determined and used to select an optimum combination for achieving the target time period.

Furthermore, it should be noted that rather than determining a total amount of power consumed by the software applications, a rate of power consumption may be determined and stored for later use in determining power consumption of software processes, applications, or the like, on the data processing system. The rate of power consumption may be determined based on the data sheets mentioned above or based on a historical monitoring of the software processes, applications, or the like.

Referring again to FIG. 2, based on these determinations, the controller 210 assigns processes to a running process list data structure 250 and a frozen process list data structure 240. Such assignment may be made in a number of different ways, all of which that may become apparent to those of ordinary skill in the art in view of the present description, are considered to be within the spirit and scope of the illustrative embodiments. For example, processes, applications, and the like, may be assigned to one of the list data structures 240 or 250 initially based on the assigned priorities and whether or not the particular priority of the process or application exceeds one or more predetermined thresholds. Thus, for example, all processes having a priority equal to or less than a "level 4" may be initially assigned to the frozen process list 240. Processes having a priority higher than "level 4" may be initially assigned to the running process list 250.

The controller 210 may then use the device monitoring agent 270 to determine the predicted power consumption of the data processing system based on the assignment of the processes to the running or frozen list data structures 240, 250. Based on the predicted power consumption and the currently available power from the depleting power source, an expected operational time period is calculated and compared to the target time period, or a remaining portion of the target time period. If the expected operational time period is equal to or greater than the target time period, then the processes in the frozen process list data structure 240 are placed in a frozen state. This suspends these processes after storing their state information for later retrieval when the processes are restarted. The processes in the running process list data structure 250 are permitted to continue execution, at least until the controller 210 determines that the circumstances of the operation of the data processing system indicate that the target time period cannot be met in a subsequent similar evaluation.

If the expected operational time period is less than the target time period, then adjustment of the assignment of the processes to the running and frozen process list data structures 240, 250. This adjustment may involve, for example, taking processes from the running process list data structure 250 and adding them to the frozen process list data structure 240 in a priority order, i.e. least priority first. Of course, a tradeoff may be made between moving a plurality of lower priority running processes to the frozen process list or moving a higher priority running process to the frozen process list. Moreover, determinations may be made as to whether modifications in processor or device operating frequency or clocking frequency may be made to achieve the desired target time period. Once an adjustment is determined that meets the target time period, or the remainder of the target time period, then those processes that are not already frozen but are on the frozen list are placed in a frozen state.

If during the moving operation, the controller 210 reaches a priority of processes, applications, etc. corresponding to the user specified required processes, then the controller 210 may determine that the target time period cannot be achieved. Accordingly, the controller 210 may send a notice to a user via the user interface 260 indicating the inability to achieve the target time period. Moreover, the notice may specify the amount of operational time that the data processing system can provide. This may be a maximum operational time period by placing as many processes on the frozen process list as possible without placing the user specified required processes on the frozen process list.

The above process may be repeated on a continuous or periodic basis with subsequent evaluations and adjustments of the running process list and frozen process list being made as necessary to achieve the target time period specified by the user. It should further be appreciated that other mechanisms for initially assigning the processes to the frozen process list (FPL) and running process list (RPL) may be utilized without departing from the spirit and scope of the illustrative embodiments. For example, rather than using priority thresholds and assigning processes based on whether they are above or below the threshold, in one illustrative embodiment, the manner by which the FPL and RPL are populated is to assign all processes to the FPL, with the exception of the required processes identified by the user, and then move processes to the RPL in priority order until the user's target requirements for the battery length cannot be met as determined by the predictive power consumption module. In another illustrative embodiment, processes may start in the RPL and be moved to the FPL until the predictive power consumption module determines that the user's target requirements for the battery length are met.

Thus, the mechanisms of the illustrative embodiments provide a dynamic mechanism for modifying the operation of the data processing system so that the operational time of the data processing system is kept within a target time period specified by the user if possible. The operational time period of the data processing system is adjusted by suspending processes on devices that consume more power than can be provided during the target time period or remaining portion of the target time period based on the current power level of a depleting power supply.

Figure 5:
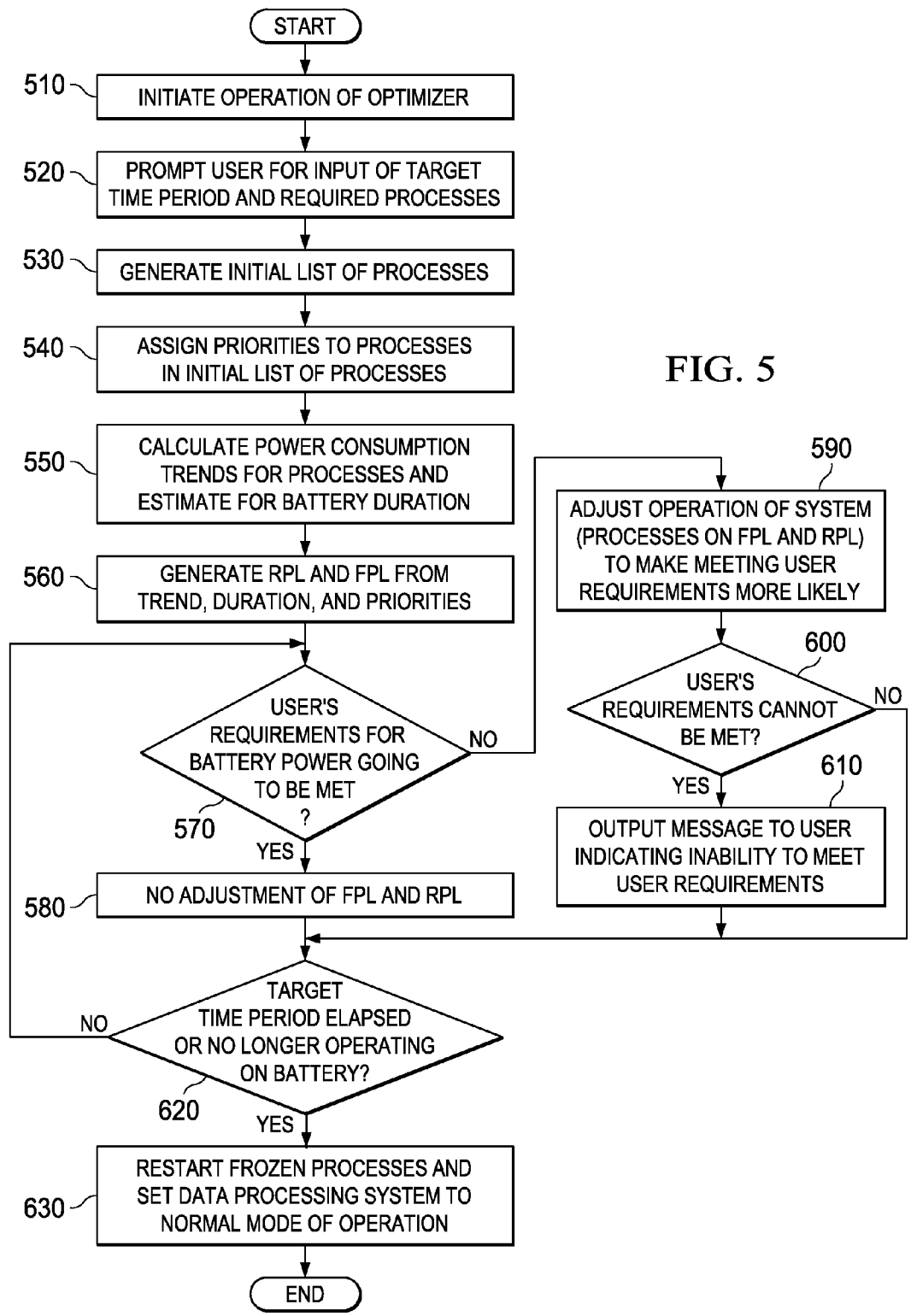
FIG. 5 is an example flowchart outlining an operation of an optimizer mechanism in accordance with one illustrative embodiment.

FIG. 5 is an example flowchart outlining an operation of an optimizer mechanism in accordance with one illustrative embodiment. As shown in FIG. 5, the operation starts with initiating operation of the optimizer due to either a user input or occurrence of an event (step 510). The optimizer prompts a user to input a target time period and zero or more processes, applications, or the like, that must be allowed to execute during the specified target time period (step 520). The optimizer generates an initial list of processes, applications, or the like (step 530) and assigns priorities to the processes, applications, etc. based on the user's specified required processes/applications, dependencies of processes/applications, and one or more rules operating on attributes or characteristics of the processes/applications in the initial list (step 540).

The optimizer uses a predictive power consumption module, such as provided by the monitoring agent 270 or 315, for example, to calculate a trend of the power consumption for each process and an estimate for the battery duration (step 550). From the calculated trend information, estimated battery duration, and priority information, a running process list (RPL) and a frozen process list (FPL) are generated (step 560). The RPL contains the identifiers of the processes that will be executed during the target time period and the FPL includes the identifiers of the processes that will be put into a frozen status in order to meet the user's target requirements for the battery length. In addition, the optimizer mechanism may determine an optimum processor clock frequency to achieve the user's target requirements for the battery length, i.e. the target time period.

The optimizer mechanism continues to monitor the system to determine if the system is or is not going to meet the user's requirements for battery power (step 570). If the target time period, or user's requirement for battery power, will be met under the current allocation of processes to the RPL and FPL at the time the optimizer mechanism is monitoring the state of the system, then no adjustments need to be made (step 580). However, if the target time period, or user's requirements for battery power, will not be met, then adjustments to the processes assigned to the RPL and FPL are made in a dynamic manner to adjust the operation of the system such that the user's requirements for battery power are more likely to be met (step 590). Such monitoring and adjustments can be done on a continuous or periodic manner while the data processing system is operating on battery power. If at any time the user's requirements for battery power cannot be met under any circumstances (step 600), a message may be output to the user indicating the inability to meet the user's requirements (step 610).

A determination is made as to whether the target time period has elapsed or if the data processing system is no longer operating on the depleting power source (step 620). For example, if the user plugs the data processing system into a constant power supply, e.g., a wall socket, or the like, then it may be determined that the data processing system is no longer operating on the depleting power source. If either of these conditions exist, then the frozen processes are restarted using their stored state information (step 630) and the data processing system operates in a normal manner. If neither of these conditions exist, then the operation returns to step 570.

Thus, the illustrative embodiments provide mechanisms for adjusting the operation of a data processing system so as to achieve a target time period for operation of the data processing system under a depleting power source. The mechanisms of the illustrative embodiments are dynamic and may adjust to changing operational conditions of the data processing system. The mechanisms of the illustrative embodiments take into account power consumption of individual processes of the data processing system and places a set of these processes into a frozen state, according to priorities assigned to these processes, so as to achieve the desired target time period of operation of the data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for adjusting an operational state of the data processing system so as to achieve a target time period of operation when the data processing system is using a depleting power supply, the method comprising:
    determining a predicted power consumption of individual processes executing on the data processing system;
    determining a remaining amount of power that the depleting power supply can provide;
    identifying a subset of processes whose execution can be suspended so that the data processing system can operate for the target period of time based on the predicted power consumption of the individual processes and the amount of power that the depleting power supply can provide; and
    placing the identified subset of processes in a suspended execution state.

2. The method of claim 1, further comprising:
    receiving a user input specifying the target time period of operation of the data processing system.

3. The method of claim 1, wherein identifying a subset of processes whose execution can be suspended comprises prioritizing the processes executing on the data processing system.

4. The method of claim 3, wherein prioritizing the processes executing on the data processing system comprise assigning priorities to processes in a list of running processes according to characteristics of the processes, and wherein the characteristics of the processes comprises a characteristic indicating whether a user has specified the process to be required to execute during the target period of time.

5. The method of claim 4, wherein the characteristics of the processes further comprises at least one of:
   a characteristic indicating whether a process has one or more other processes indicated by the user to be required to execute during the target period of time,
   a characteristic indicating whether a process is required by an operating system, or
   a characteristic indicating whether a process is required for proper operation of a device in the data processing system utilized by another process specified by the user as being required to execute during the target time period.

6. The method of claim 5, further comprising:
   dynamically adjusting, during the target time period of operation, the identified subset of processes in the suspended execution state by either adding one or more processes to or removing one or more processes from the identified subset of processes in the suspended execution state in response to the predicted power consumption of individual processes executing on the data processing system and the remaining amount of power that the depleting power supply can provide changing.

7. The method of claim 1, repeatedly performing the method during the target time period of operation in either a constant or periodic manner.

8. The method of claim 1, further comprising:
   maintaining a list of processes placed in the suspended execution state; and
   removing processes from the list of processes placed in the suspended execution state in response to one of the data processing system being coupled to a constant supply of power or a change in the predicted power consumption of individual processes executing on the data processing system or a remaining amount of power that the depleting power supply can provide indicating an excess amount of available power for a remaining amount of the target time period.

9. The method of claim 8, further comprising:
   storing a state of each of the processes placed in the suspended execution state;
   restoring a state of a process in response to the process being removed from the list of processes placed in the suspended execution state; and
   executing the process whose state is restored.

10. The method of claim 1, further comprising:
    modifying an operating speed of one or more devices of the data processing system based on the predicted power consumption of individual processes executing on the data processing system and the remaining amount of power that the depleting power supply can provide.

11. A computer program product comprising a non-transitory computer recordable medium having a computer readable program recorded thereon, wherein the computer readable program, when executed on a computing device, causes the computing device to:
    determine a predicted power consumption of individual processes executing on the computing device;
    determine a remaining amount of power that the depleting power supply can provide;
    identify a subset of processes whose execution can be suspended so that the data processing system can operate for the target period of time based on the predicted power consumption of the individual processes and the amount of power that the depleting power supply can provide; and
    place the identified subset of processes in a suspended execution state.

12. The computer program product of claim 11, wherein the computer readable program further causes the computing device to:
    receive a user input specifying the target time period of operation of the computing device.

13. The computer program product of claim 11, wherein the computer readable program causes the computing device to identify a subset of processes whose execution can be suspended by prioritizing the processes executing on the computing device.

14. The computer program product of claim 13, wherein the computer readable program further causes the computing device to prioritize the processes executing on the computing device by assigning priorities to processes in a list of running processes according to characteristics of the processes, and wherein the characteristics of the processes comprises a characteristic indicating whether a user has specified the process to be required to execute during the target period of time.

15. The computer program product of claim 14, wherein the characteristics of the processes further comprises at least one of:
    a characteristic indicating whether a process has one or more other processes indicated by the user to be required to execute during the target period of time,
    a characteristic indicating whether a process is required by an operating system, or
    a characteristic indicating whether a process is required for proper operation of a device in the computing device utilized by another process specified by the user as being required to execute during the target time period.

16. The computer program product of claim 15, wherein the computer readable program further causes the computing device to:
    dynamically adjust, during the target time period of operation, the identified subset of processes in the suspended execution state by either adding one or more processes to or removing one or more processes from the identified subset of processes in the suspended execution state in response to the predicted power consumption of individual processes executing on the computing device and the remaining amount of power that the depleting power supply can provide changing.

17. The computer program product of claim 11, wherein the computer readable program further causes the computing device to repeatedly perform the determine, identify, and place operations during the target time period of operation in either a constant or periodic manner.

18. The computer program product of claim 11, wherein the computer readable program further causes the computing device to:
    maintain a list of processes placed in the suspended execution state; and
    remove processes from the list of processes placed in the suspended execution state in response to one of the computing device being coupled to a constant supply of power or a change in the predicted power consumption of individual processes executing on the computing device or a remaining amount of power that the depleting power supply can provide indicating an excess amount of available power for a remaining amount of the target time period.

19. The computer program product of claim 18, wherein the computer readable program further causes the computing device to:
store a state of each of the processes placed in the suspended execution state;
restore a state of a process in response to the process being removed from the list of processes placed in the suspended execution state; and
execute the process whose state is restored.

20. An apparatus, comprising:
a processor; and
a memory coupled to the processor, wherein the memory comprises instructions which, when executed by the processor, cause the processor to:
determine a predicted power consumption of individual processes executing on the computing device;
determine a remaining amount of power that the depleting power supply can provide;
identify a subset of processes whose execution can be suspended so that the data processing system can operate for the target period of time based on the predicted power consumption of the individual processes and the amount of power that the depleting power supply can provide; and
place the identified subset of processes in a suspended execution state.

* * * * *